(12) United States Patent
Jones

(10) Patent No.: US 6,210,512 B1
(45) Date of Patent: Apr. 3, 2001

(54) EMBOSSING OF LAMINATED PICTURE FRAME MOLDING

(75) Inventor: Joseph W. Jones, Statesville, NC (US)

(73) Assignee: Intercraft Company, Statesville, NC (US)

( * ) Notice: Subject to any disclaimer, the term of this patent is extended or adjusted under 35 U.S.C. 154(b) by 0 days.

(21) Appl. No.: 09/008,149

(22) Filed: Jan. 16, 1998

Related U.S. Application Data

(62) Division of application No. 08/670,329, filed on Jun. 25, 1996, now abandoned.

(51) Int. Cl.[7] .................................................. B32B 31/00
(52) U.S. Cl. .................... 156/220; 156/201; 156/212; 156/213; 156/214; 156/199; 156/219; 144/358
(58) Field of Search .................... 156/220, 468, 156/475, 553, 578, 547, 548, 199, 201, 212–214, 219, 581, 582, 465, 209; 101/6; 144/358

(56) References Cited

U.S. PATENT DOCUMENTS

| | | |
|---|---|---|
| 146,449 * | 1/1874 | Gschwind ............................ 156/220 |
| 366,835 | 7/1887 | Hogan . |
| 1,606,863 | 11/1926 | Zimmerman, Jr. . |
| 1,744,345 * | 1/1930 | Swanson .......................... 156/220 X |
| 3,097,592 * | 7/1963 | Friedman ............................. 101/6 X |
| 3,475,261 * | 10/1969 | Ettore et al. .......................... 156/220 |
| 3,540,960 * | 11/1970 | Widigs . |
| 3,567,538 * | 3/1971 | Lind ..................................... 156/220 |
| 3,764,767 | 10/1973 | Randolph . |
| 4,696,714 * | 9/1987 | Voorhees ............................... 756/468 |
| 5,304,412 | 4/1994 | Wang . |

* cited by examiner

Primary Examiner—Jeff H. Aftergut
(74) Attorney, Agent, or Firm—Foley & Lardner

(57) ABSTRACT

Molding, such as that used in the manufacture of picture frames, is laminated with a covering wrap of foil, paper, plastic, cloth, or wood veneer and is embossed on the same machine shortly thereafter. The covering wrap is adhered by an adhesive and the embossed pattern is formed in part by pressure of a pattern against the substrate and through the covering wrap and partly by forcing of the adhesive used in the laminating process into various raised portions of the pattern, thus supporting and enhancing the embossed profile.

11 Claims, 3 Drawing Sheets

EMBOSSING OF LAMINATED PICTURE FRAME MOLDING

CROSS-REFERENCES TO RELATED APPLICATIONS, IF ANY

This is a Divisional application of U.S. application Ser. No. 08/670,329, filed on Jun. 25, 1996, now abandoned.

BACKGROUND OF THE INVENTION

1. Field of the Invention

The present invention relates generally to the art of decorative articles, such as moldings used in the manufacture of picture frames. More specifically, the present invention relates to an embossing apparatus and method used in sequence with a laminator which applies a covering wrap about a molding substrate.

2. Description of the Prior Art

The art of manufacturing picture frames is ancient by origin. Processes are still being developed to this date to accomplish the purposes originally intended, i.e. to support and enhance an art work presented to an observer. Early frames were manufactured by hand carving wood, a process which continued well into the renaissance.

One subsequent technique involved the use of plaster for coating wood substrates to allow the artist to emboss or form deep relief, in giving the same look as carved wood or marble with much less work or cost.

Subsequent artisans also developed the technique of layering plaster in wooden forms using burlap, with plaster layers built up one layer at a time and formed with a form tool or drag. This process was used to make moldings for buildings and quickly was adapted for use in picture frames. The plaster was frequently covered with gold leaf, and covered with shellac or varnish. Extremely intricate moldings were created, but obviously they were very expensive, even centuries ago.

The technology of frame making remained somewhat static until the Eighteenth Century, when advances were made in furniture manufacture. Craftsmen developed new techniques for making joints, and the precision of picture frame moldings became markedly improved. The Industrial Revolution led to specially designed machines to assist in the making of frames.

The development of the camera increased further the demand for less expensive picture frames which, as recently as the 1930's, still were beyond the means of the masses. Machines for duplicating the work of carvers were developed. The cost of labor was reduced, but the cost of the material was still a major factor in the overall cost. More recently, manufacturers have looked to alternate methods that use less expensive materials. Instead of rare woods, such as mahogany, teak and rosewood, manufacturers resorted to less expensive woods, such as poplar, oak and birch. Cheaper wood was frequently stained to imitate more expensive wood.

Eventually, even the cost of common wood became a larger factor in the cost of mass produced frames. With the development of plywood in the 1940's, the use of veneers became popular, and more expensive wood veneers were glued to less expensive wood by both furniture and picture frame manufacturers. Flake board or particle board became more popular in later years, and to drive costs down even more, manufacturers began to experiment with laminating paper to wood. The paper could be obtained in any pattern. Machinery which was originally developed for laminating veneer to wood was modified to laminate paper and other materials to the wooden substrates.

The most common substrate used in the molding industry today is medium density fiberboard, known as "MDF". Its use began to lower prices in the furniture industry and it was very popular in the ready-to-assemble furniture markets. Frame manufacturers readily adapted MDF to their uses. The decoration that was most commonly used on such moldings was paper, with the paper designs changing as frequently as the artists desired. Little was done to improve the finish, durability or functionality of the papers used in laminating.

It is also known that a design can be burned into wood, using embossing rollers. An example of this process is shown in U.S. Pat. No. 3,764,767 issued Oct. 9, 1973 to Randolph for "Induction Embossing". In this process, a wheel which can be adjusted in temperature using induction heating, is driven into contact with a molding substrate to impress upon it a particular pattern. Such process is applied directly to the wood, and it has never been suggested that such processes could be used on MDF or other substrates which have been laminated with paper.

Other methods for preparing ornamentation include the hot stamping technique shown in U.S. Pat. No. 3,540,960 issued Nov. 17, 1970 to Widigs for "Method Of Ornamenting A Wood Article With Metal Foil". A tape of ornamentating material is placed between the article and a set of rollers, the tape preferably comprising a strip of plastic material having a thin layer of ornamentation, for example gold leaf or the like, thereon. The metal layer of the tape adheres to and covers an impression made by the rollers, thereby creating a pleasing ornamental effect and the carrier tape itself is removed and discarded.

Several other patents illustrating ornamentation of moldings include U.S. Pat. No. 1,606,863 issued Nov. 16, 1926 to Zimmerman for "Picture Frame And Method Of Producing The Same" (showing pressure embossing of corner joints); U.S. Pat. No. 366,835 issued Jul. 19, 1887 to Hogan for "Picture Frame"; U.S. Pat. No. 5,304,412 issued Apr. 19, 1994 to Wang for "Extruded Plastic Article With A Decorative Plastic Strip" (showing the bonding of a decorative plastic strip to a plastic frame member).

In addition to paper for laminating processes, other covering materials have been employed in the prior molding art, including foil, plastic, cloth or wood veneer. Furthermore, in typical laminating operations, glues are applied to a depth of about 1½ mils. Typically, the glues are hot melts. Paper commonly used in the process is 40 weight (forty pounds per 1,000 square feet), while 4 mil. vinyl is frequently used when a plastic material is desired. The particular shape of the molding can be any of the hundreds of profiles known in the art.

While the techniques of laminating and of embossing have been separately employed to make decorative picture frames, it has not been suggested to combine the two in a single operation, probably because most embossing processes known in the art would be detrimental to the paper. A technique which would allow the lamination of inexpensive substrates with covering material and which would also allow for the creation of an embossed pattern thereon would represent a significant advance in this technology.

FEATURES AND SUMMARY OF THE INVENTION

The present invention features an apparatus and process for embossing laminated moldings, such as moldings used in picture frame manufacture.

The present invention also features an apparatus and method for embossing a variety of molding profiles covered with a variety of types of laminating materials.

The present invention further features a technique for embossing a laminated molding wherein the embossing step is performed soon after the laminating step and wherein the adhesive used in the laminating process enhances the embossed pattern.

Also featured in the present invention is a embossing apparatus and process which may be readily adapted to a variety of embossing patterns, for example, applying more than one pattern on the laminated molding.

How these and other features of the present invention are accomplished will be described in connection with the following Detailed Description of the Preferred Embodiment, taken in conjunction with the drawings. Generally, however, the features are provided by employing an embossing assembly in line with conventional molding laminating equipment. The embossing assembly includes a roller having a pattern thereon and a mounting for the roller to allow the pattern to be impressed on the recently laminated molding under controlled pressure. In its most preferred embodiment, the invention includes embossing at speeds of up to two hundred feet per minute and in widths from ⅛" to 1". The patterns are applied to picture frame moldings which have been laminated and preferably the embossing is accomplished while the glue used in the laminating process is still in a liquid or molten condition, to cause the glue to rise into raised portions of the pattern and to thereby enhance the molding pattern.

Other ways in which the features of the present invention are accomplished will become apparent to those skilled in the art after they have read the present specification. Such other ways are deemed to fall within the scope of the present invention, if they fall within the scope of the claims which follow.

DESCRIPTION OF THE DRAWINGS

In the various FIGURES, like reference numerals are used to illustrate like components.

DETAILED DESCRIPTION OF THE PREFERRED EMBODIMENT

Before proceeding to the detailed description of the illustrated and preferred embodiment, several general comments can be made about the applicability and the scope of the present invention. First, the substrate material may be selected from any known material useful for making moldings, including picture frame moldings. The most common molding substrates are plastic, wood, metal and most preferably medium density fiberboard, otherwise known in the industry as MDF.

Second, the laminating wrap may also be widely varied and include such well-known materials as paper, paper laminates, foil, plastic and the like. In the preferred embodiment, the material is a paper laminate having 40/wt. (forty pounds per 1,000 square feet) paper as a major component.

Third, the particular type of adhesive is not critical and can be selected from those which are well-known in this art. The particular techniques and devices for urging the wrap into contact with the substrate can include rollers and pads arranged along the path of travel of the substrate, such that the wrap is firmly urged into contact therewith. Many different types of processing machines are in use in the molding industry, many of which can be used with the present invention, as long as there is room to add the embossing equipment to be described later herein.

Fourth, the particular embossing apparatus shown in the most preferred and illustrated embodiment is not to be taken as limiting as other arrangements can be used. The illustrated device includes a single roller having a single embossed pattern on its circumferential edge. The pattern is uniform around the roller. Other types of rollers can be employed, including those which have different patterns on different portions of their periphery. It is also within the scope of the present invention to use a plurality of rollers arranged sequentially or at the same location in the apparatus to apply the same or different patterns to different portions of the profile. After the present invention is described in connection with the illustrated embodiment, one skilled in the art will be able to readily appreciate such changes without undue experimentation.

Figure 1:
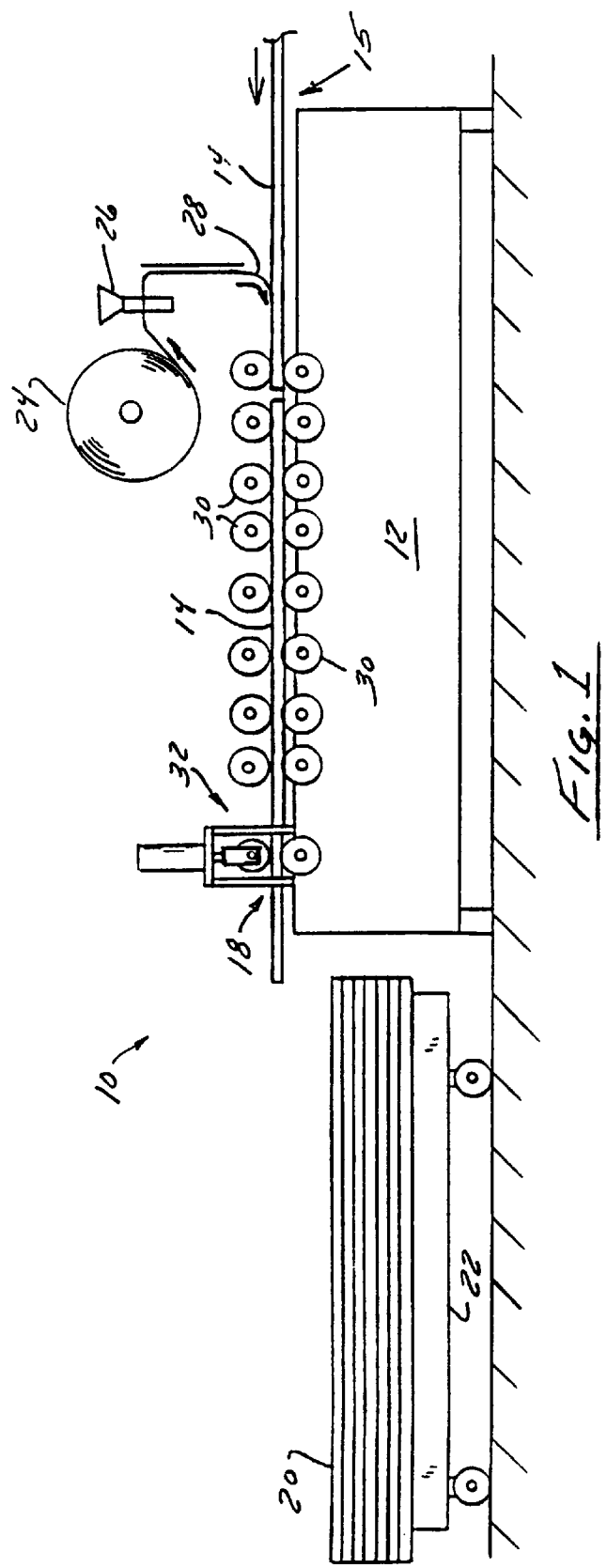
FIG. 1 is a schematic illustration of a molding and laminating device of the present invention.

Referring now to FIG. 1, a laminating and embossing apparatus 10 includes a frame 12 for supporting the laminating and embossing equipment. The substrate to be laminated and embossed is illustrated at reference numeral 14 and is pre-cut length molding substrate as described above. It travels at a predetermined speed along a longitudinal path from an inlet end 15 to an outlet end 18 at which point the laminated and embossed product 20 is stacked. A roller cart 22 may be employed to transfer the finished product to other stations within a factory, such as stations for cutting and assembling the laminated molding into picture frames.

As illustrated schematically in FIG. 1, covering wrap from 24 passes through a glue section 26 toward the substrate 14. The covering wrap with the glue applied is designated 28 and is urged into contact with substrate 14 by a plurality of rollers and pads 30 configured for the specific substrate profile. Details of this equipment will not be provided as such rollers and pads are well-known and do not, in and of themselves, form part of the present invention. An embossing station 32 is provided near the downstream end of apparatus 10, which embossing station will be described in greater detail in later sections of this specification.

Figure 2:
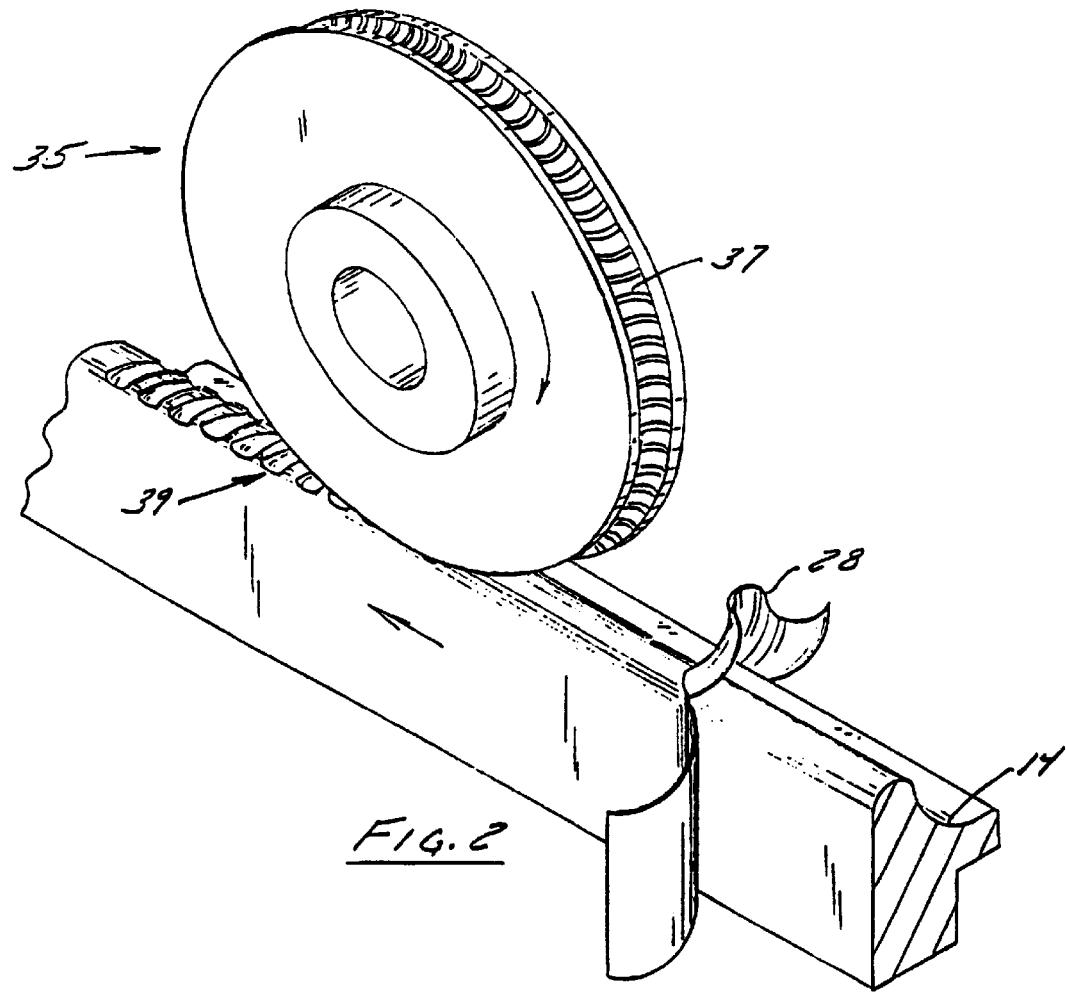
FIG. 2 is a perspective illustration of the substrate, laminating material and embossing roller of the present invention.

FIG. 2 illustrates, in schematic form, the substrate 14, the wrap 28 with the glue applied thereto and a roller 35 which is part of the embossing station 32. The illustrated roller includes a pattern 37 for impressing a ribbed pattern 39 on the laminated substrate. The direction of travel of the substrate and the roller are illustrated by the arrows in FIG. 2. In this illustration, the laminated covering wrap 28 with the glue applied is peeled back for purposes of illustration only, it being understood that in practice the entire profile of the substrate 14 would be covered with the wrap as it approaches the embossing station 35.

Figure 3:
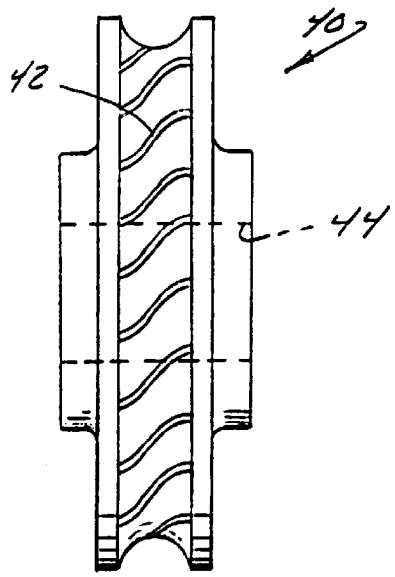
FIG. 3 is a perspective view of the embossing assembly of the apparatus of the present invention illustrating the support roller and the hydraulic system for controlling the depth of the embossing.
Figure 4:
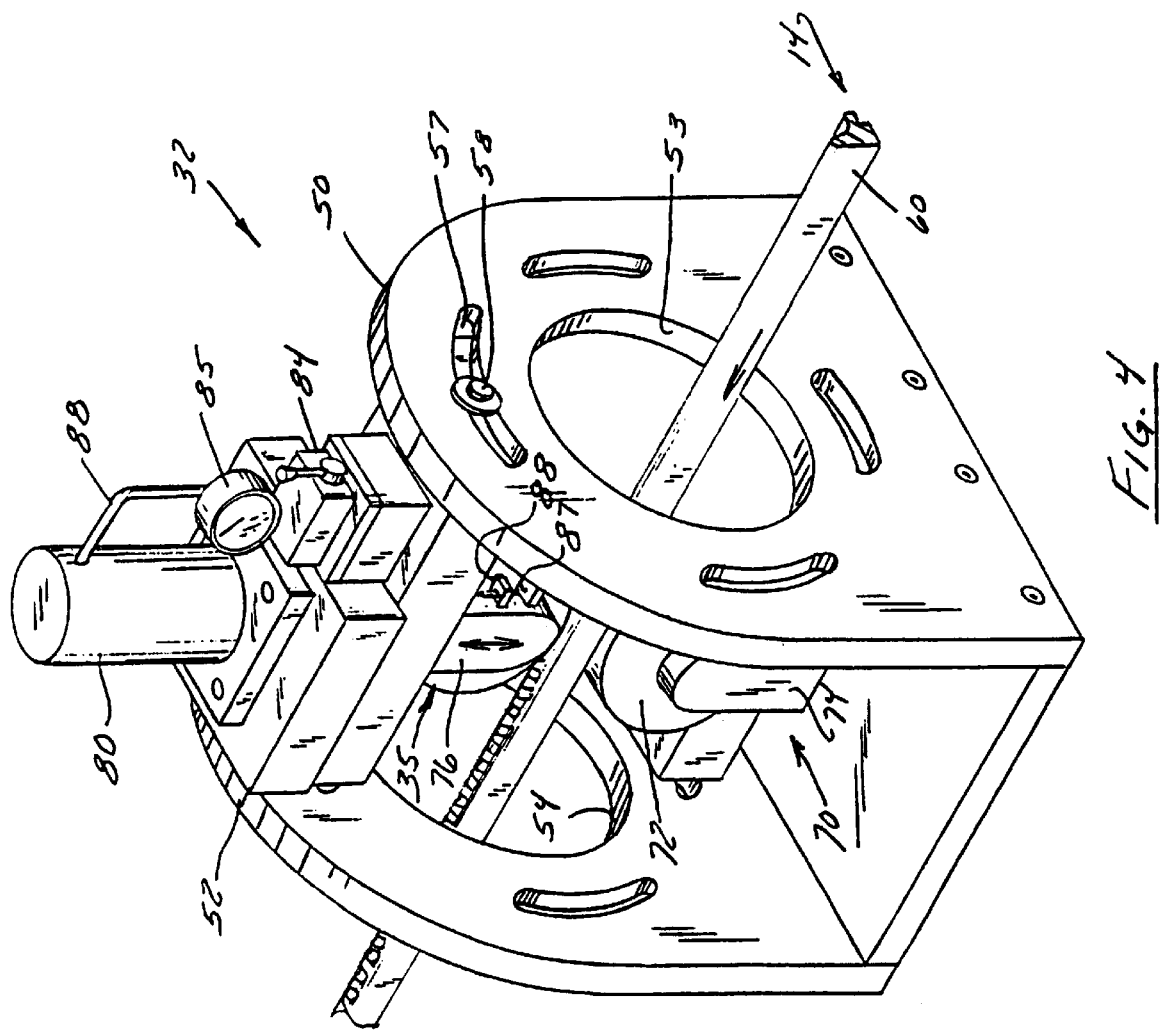
FIG. 4 is an end view of an embossing roll illustrating one pattern which is useful in the present invention.

An end view of an alternative form of embossing roller 40 is shown in FIG. 3, this time illustrating a wave pattern 42 and showing the annular bore 44 of the roller used to attach it to the apparatus to be described now in connection with FIG. 4.

The substrate is shown in FIG. 4 to pass through a pair of plates 50 and 52 having a pair of aligned circular openings 53 and 54 therein. The plates are used to mount embossing station 32. The plates each include a series of open slots 57 arranged around the axis of openings 53 and 54 and are designed to permit a variety of mounting angles for the embossing station 32 between plates 50 and 52. The embossing station 32 may be secured to the plates, such as by bolts 58. It can be appreciated that the area on the profile of substrate 14 which is embossed may be altered by changing the way in which embossing station 32 is mounted. In the illustrated embodiment, embossing takes place at the top of profile 14. By rotating embossing station 32 counterclockwise by 90°, the vertical face 60 of the substrate 14 profile can be embossed using whatever pattern the operator selects. It is also clear from the discussion thus far that two or more embossing stations 32 may be mounted in sequence by providing additional pairs of mounting plates.

Embossing station 32 includes a free-running support roller 72 below the path of travel to substrate 14. It is mounted for rotational movement on a frame 74. The material used for this roller may be resilient or rigid, depending on the pattern to be applied by the embossing station 32. Mounted above the path of travel of substrate 14 is the embossing roll 35 mounted for free running movement in the direction of the arrows on a roller mounting assembly 76. That assembly may be moved toward and away from substrate 14 depending upon the positioning of a piston extending from a power cylinder 80. The cylinder may be hydraulic or pneumatic, and is controlled by control 84. A pressure gauge 85 may also be provided. Power to the cylinder is provided through piping 88.

The roller 35 and the mounting assembly 76 are arranged to place the circumferential edge of roller 35 in contact with the upper surface of substrate 14 at a suitable pressure for embossing the desired pattern. To prevent greater penetration than desired, a stop plate 87 is mounted to plate 50 and a limit plate 88 is mounted to the support roller 76. The components 87 and 88 act as a mechanical limit to ensure a proper depth of embossing. The type of limit device may be varied, and an electric eye system, a proximity switch or an electromechanical limit switch could be readily substituted.

The speed of embossing is controlled solely by the speed of the laminating device or other external means, such as hand-feed. The embossing roll is free wheeling and, in the preferred embodiment, is not powered. A positive drive for the embossing roller is, however, within the scope of the present invention. The location of the device is such that the device may be moved back and forth on the laminator machine 10 to locate the pattern roller in the proper position with respect both to the speed of movement of the substrate 14 and the characteristics of the laminating wrap and the particular adhesive system employed. It should be reiterated that more than one roller or more than one pattern with more than one diameter and width can also be used on the same laminated molding. The devices may be used in duplicate, triplicate, or more with more than one device used with each system to allow a wide variety of patterns for the embossing.

It has been found that the process of the present invention does not rely entirely on the pressure exerted by roller 35 against the laminated substrate, but in part improved results are achieved by pressing adhesive into the various raised portions of the pattern to support and enhance the embossed profile. Certainly, some deformation or indentation of the laminate and the substrate occur, but the enhancement by movement of the adhesive is also an important feature of the most preferred form of this invention.

While the present invention has been described in connection with the illustrated embodiment, the invention may be variously embodied as indicated in the description provided above. The invention is therefore not to be limited by the illustrated embodiment but is to be limited solely by the scope of the claims which follow.

What is claimed is:

1. A process for preparing an embossed, laminated picture frame molding comprising the steps of:
   providing an elongate, picture frame molding substrate having a desired cross-sectional profile;
   laminating a wrap about at least a portion of the profile of the substrate using a coating consisting essentially of a liquid adhesive, the wrap having paper as a major component; and
   embossing a pattern on at least a portion of the laminated portion of the substrate while the liquid adhesive remains in a liquid condition to cause the liquid adhesive to move into raised portions of the embossed pattern to support and enhance the embossed pattern.

2. The process of claim 1 wherein the substrate is selected from the group consisting of wood, MDF, metal, and plastic moldings.

3. The process of claim 1 comprising the additional step of controlling the depth of the embossing.

4. The process of claim 3 wherein the controlling step comprises moving an embossing wheel under pressure against the laminated substrate.

5. The process of claim 3 comprising the additional step of limiting the depth of embossing.

6. The process of claim 5 wherein the limiting step is accomplished by providing a mechanical stop.

7. The process of claim 5 wherein the limiting step is accomplished by an electromechanical limit switch.

8. The process of claim 5 wherein the limiting step is accomplished by a photoelectric limit switch.

9. The process of claim 5 wherein the limiting step is accomplished by a proximity switch.

10. The process of claim 1 wherein at least two spaced apart areas of the laminated substrate are embossed simultaneously.

11. The process of claim 1 wherein at least two spaced apart areas of the laminated substrate are embossed sequentially.

* * * * *